United States Patent
Jung et al.

(10) Patent No.: US 9,389,463 B2
(45) Date of Patent: Jul. 12, 2016

(54) LIQUID CRYSTAL DISPLAY INCLUDING SPACER IN INSULATING LAYER OPENING

(71) Applicant: Samsung Display Co., Ltd., Yongin, Gyeonggi-Do (KR)

(72) Inventors: Jin-Soo Jung, Hwaseong-si (KR); Bong Sung Seo, Suwon-si (KR); Jun Woo Lee, Seongnam-si (KR); Baek Kyun Jeon, Yongin-si (KR); Min-Sik Jung, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 87 days.

(21) Appl. No.: 14/325,453

(22) Filed: Jul. 8, 2014

(65) Prior Publication Data

US 2015/0077677 A1  Mar. 19, 2015

(30) Foreign Application Priority Data

Sep. 13, 2013  (KR) .................. 10-2013-0110681

(51) Int. Cl.
*G02F 1/1339* (2006.01)
*G02F 1/1343* (2006.01)
*G02F 1/1337* (2006.01)
*G02F 1/136* (2006.01)
*G02F 1/1362* (2006.01)

(52) U.S. Cl.
CPC ........ *G02F 1/133711* (2013.01); *G02F 1/1339* (2013.01); *G02F 1/136227* (2013.01); *G02F 2202/023* (2013.01)

(58) Field of Classification Search
CPC ............ G02F 1/13394; G02F 1/13392; G02F 1/133512; G02F 1/1339; G02F 1/134363; G02F 1/133707; G02F 1/136213; G02F 1/1337; G02F 1/133711; G02F 1/1368; G02F 1/3624; H01L 27/1214
USPC .................................. 349/43, 123, 141, 155
See application file for complete search history.

(56) References Cited

U.S. PATENT DOCUMENTS

| | | | |
|---|---|---|---|
| 6,063,829 A | 5/2000 | Endou et al. | |
| 7,570,338 B2 * | 8/2009 | Yoon ................... | G02F 1/13394 349/155 |
| 7,659,960 B2 * | 2/2010 | Doi ..................... | G02F 1/13392 349/155 |
| 7,969,545 B2 | 6/2011 | Lee | |
| 8,284,371 B2 | 10/2012 | Kim et al. | |
| 2013/0063673 A1 * | 3/2013 | Choi ................. | G02F 1/136227 349/43 |

FOREIGN PATENT DOCUMENTS

| | | | |
|---|---|---|---|
| JP | 3893659 B2 | 3/2007 | |
| JP | 4266057 B2 | 5/2009 | |
| JP | 2009-282262 A | 12/2009 | |
| KR | 1020060134760 A | 12/2006 | |
| KR | 10-0817337 B1 | 3/2008 | |

* cited by examiner

*Primary Examiner* — Mike Qi
(74) *Attorney, Agent, or Firm* — Cantor Colburn LLP

(57) ABSTRACT

Provided is a liquid crystal display, including: a first substrate; a first electrode and a second electrode disposed on the first substrate and overlapping with each other with a first insulating layer therebetween; a second insulating layer disposed on the first substrate and having an opening; a second substrate facing the first substrate; a first alignment layer disposed on the first substrate; a second alignment layer disposed on the second substrate; and a spacer disposed between the first alignment layer and the second alignment layer, in which the spacer is positioned in the opening.

20 Claims, 10 Drawing Sheets

ND SPACER IN INSULATING LAYER OPENING

LIQUID CRYSTAL DISPLAY INCLUDING SPACER IN INSULATING LAYER OPENING

This application claims priority to Korean Patent Application No. 10-2013-0110681 filed on Sep. 13, 2013, and all the benefits accruing therefrom under 35 U.S.C. §119, the entire contents of which are incorporated herein by reference.

BACKGROUND (a) Technical Field

The invention relates to a liquid crystal display.

(b) Description of the Related Art

A liquid crystal display, as one flat panel display, is a display device in which liquid crystal molecules of a liquid crystal layer are rearranged by applying a voltage to an electrode to thereby control an amount of transmitted light.

As a method for increasing transmittance and implementing a wide viewing angle of the liquid crystal display, a liquid crystal display, in which a pixel electrode and a common electrode are disposed on one substrate in a single display panel, has received attention.

An alignment layer is disposed on an inner surface of the display panel of the liquid crystal display to control pretilt directions of the liquid crystal molecules, and a method in which the alignment layer includes a photoreactive material which is photo-aligned is proposed.

In order to maintain a distance between two display panels of a liquid crystal display, between which the liquid crystal layer of the liquid crystal display is disposed, a spacer is used.

SUMMARY

One or more exemplary embodiment of the invention provides a liquid crystal display having advantages of reducing or effectively preventing a defect of an alignment layer thereof, while increasing transmittance of the liquid crystal display and having a wide viewing angle.

An exemplary embodiment of the invention provides a liquid crystal display, including: a first substrate; a first electrode and a second electrode on the first substrate and overlapping with each other; a first insulating layer between the first and second electrodes; a second insulating layer on the first substrate, and an opening defined in the second insulating layer; a second substrate facing the first substrate; a first alignment layer on the first substrate; a second alignment layer on the second substrate; and a spacer between the first alignment layer and the second alignment layer and in the opening.

The first alignment layer and the second alignment layer may be photo-alignment layers.

The spacer may have a bead form.

The second insulating layer may include an organic material.

The first electrode may have a planar shape and be disposed on an entire surface of a pixel area defined on the first substrate, the second electrode may include a plurality of branch electrodes, and the plurality of branch electrodes may overlap with the first electrode having the planar shape.

The liquid crystal display may further include a gate line, a data line, and a thin film transistor connected to the gate line and the data line, on the first substrate. The thin film transistor may be connected to the first electrode or the second electrode at the opening defined in the second insulating layer.

The second insulating layer may be a light blocking member.

According to one or more exemplary embodiment of the invention, since facing alignment layers of a liquid crystal display do not contact each other, a defect of an alignment layer may be reduced or effectively prevented, while increasing transmittance and viewing angle.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
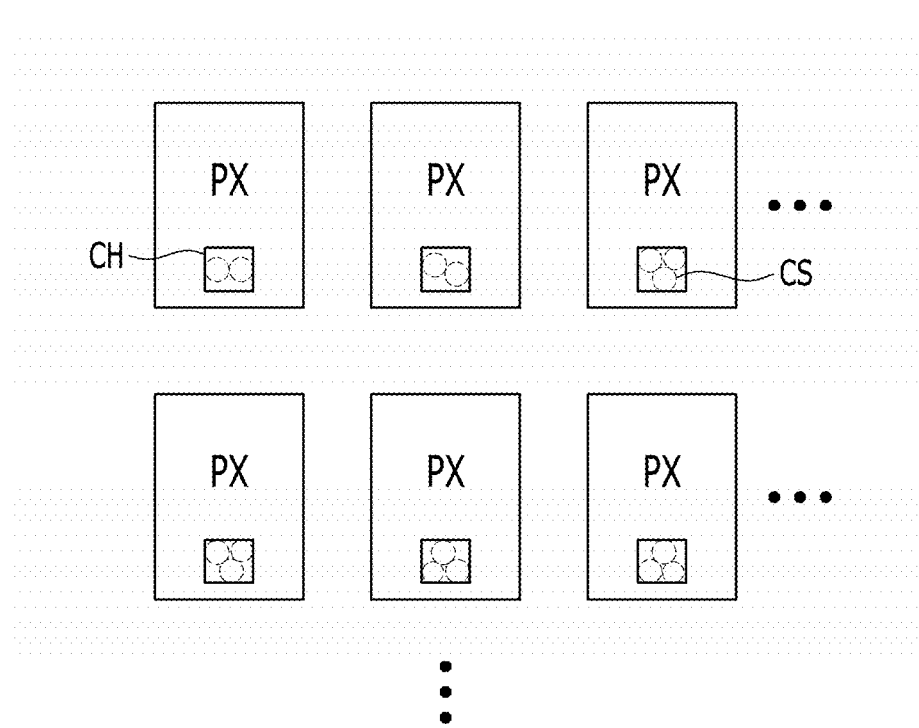
FIG. 1 is a plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, connected may refer to elements being physically and/or electrically connected to each other. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In an method of manufacturing a liquid crystal display, after a spacer is formed such as by a photolithography process, when two display panels of the liquid crystal display are bonded with each other, an alignment layer formed on a surface of one display panel with the spacer and an alignment layer formed on a surface of the other display panel facing the spacer contact each other. Where pressure is applied to the liquid crystal display, the alignment layers respectively formed on the two display panels contact each other. As such, while the alignment layers formed on the two display panels contact each other, one or both of the alignment layers may release or separate from the respective display panel. As such, when a defect is generated in the alignment layer, a problem such as light leakage may occur in the display device.

Further, where the spacer of the liquid crystal display is disposed in an opening region defined in a layer of a display panel, an aperture ratio of the liquid crystal display is decreased, such that when the aperture ratio of the liquid crystal display is decreased, transmittance of the liquid crystal display is decreased.

Hereinafter, the invention will be described in detail with reference to the accompanying drawings.

A liquid crystal display according to the invention will be described with reference to the drawings.

First, an exemplary embodiment of a liquid crystal display according to the invention will be described with reference to FIG. 1. FIG. 1 is a plan view of an exemplary embodiment of a liquid crystal display according to the invention.

Referring to FIG. 1, a liquid crystal display includes a plurality of pixels PX. Each pixel PX includes a contact portion CH, and a spacer CS is disposed in the contact portion CH of each pixel PX.

A width of the contact portion CH of each pixel PX may be about 6 micrometers (μm)±2 μm or more, and a diameter of the spacer CS may be about 6 μm±2 μm or more. Referring to the plan view of FIG. 1, the width of the contact portion CH may be taken in the horizontal or vertical direction, but is not limited thereto. A dimension of the spacer CS may be taken in the same direction as that in which the width of the contact portion CH is taken.

At least one spacer CS is positioned in the contact portion CH. The liquid crystal display may include more than one spacer CS in the contact portion CH.

Figure 2:
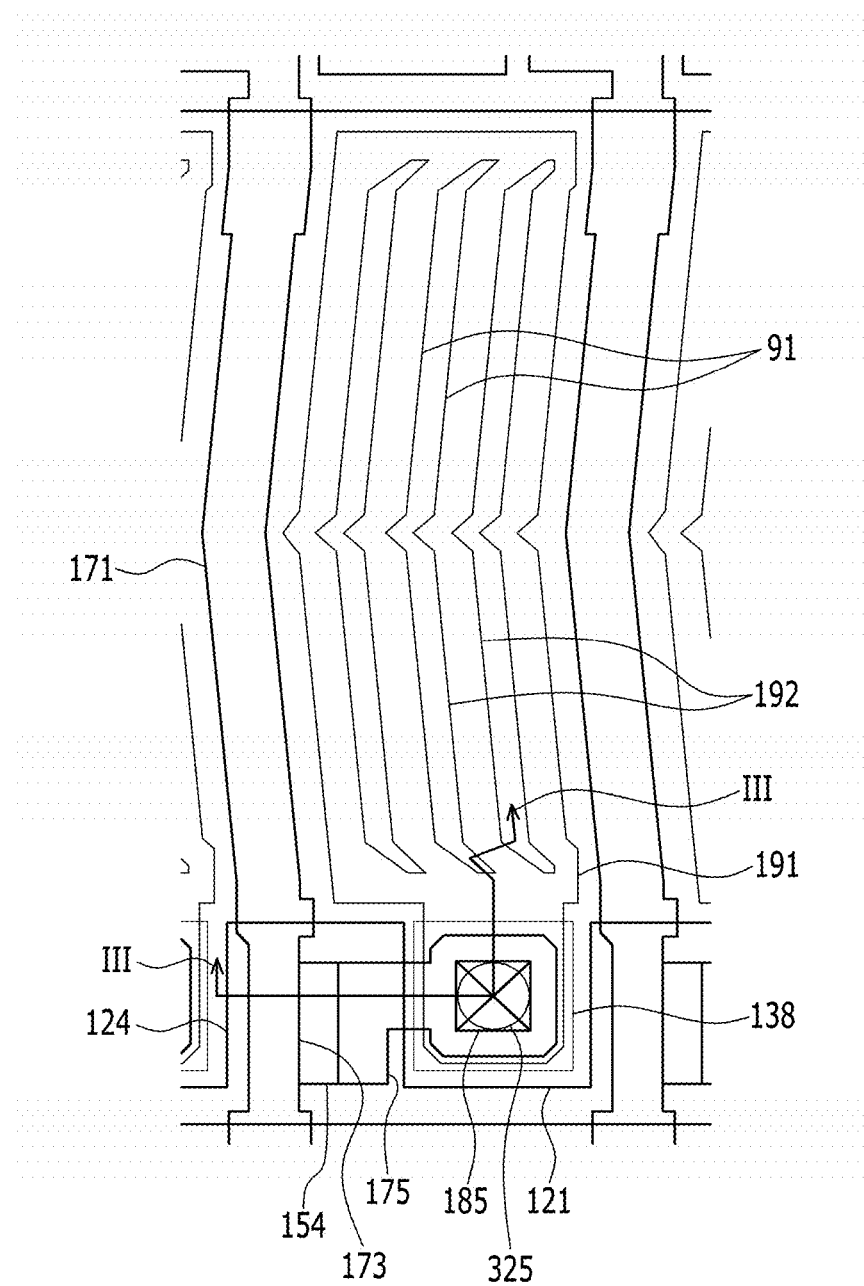
FIG. 2 is a plan view of an exemplary embodiment of one pixel of a liquid crystal display according to the invention.

Next, a detailed configuration of the liquid crystal display according to the invention will be described with reference to FIGS. 2 and 3. FIG. 2 is a plan view illustrating an exemplary embodiment of one pixel of a liquid crystal display according to the invention, and FIG. 3 is a cross-sectional view of the liquid crystal display of FIG. 2 taken along line III-III.

Figure 3:
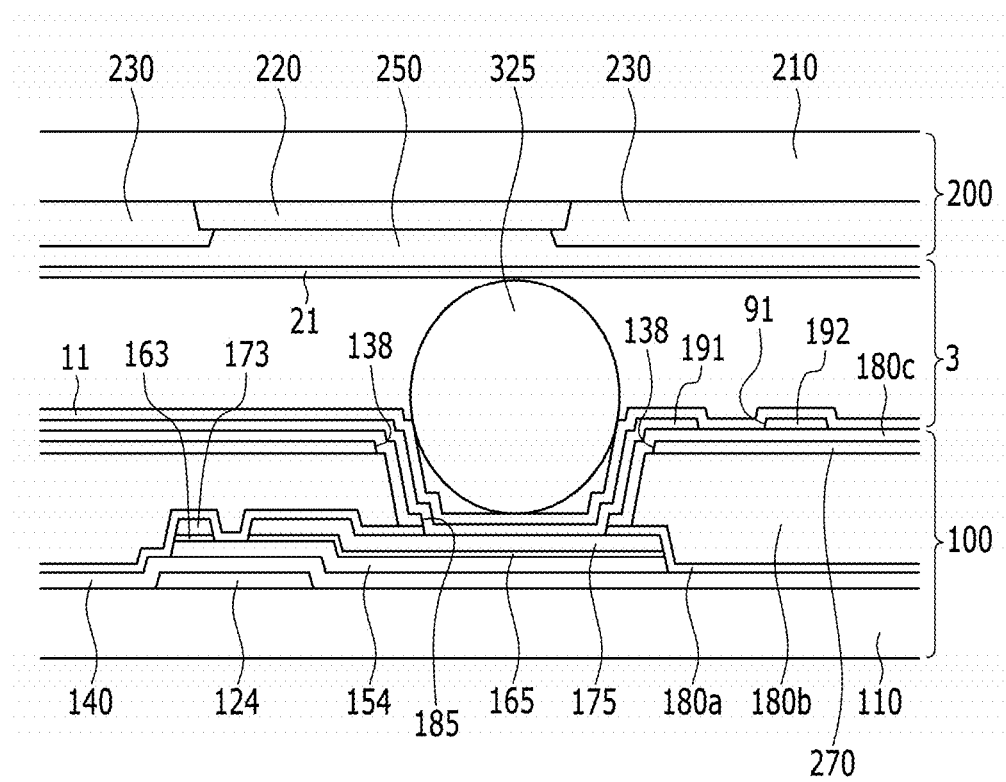
FIG. 3 is a cross-sectional view illustrating the liquid crystal display of FIG. 2 taken along line III-III.

Referring to FIGS. 2 and 3, the liquid crystal display includes a lower panel 100 and an upper panel 200 facing each other, and a liquid crystal layer 3 disposed therebetween.

First, the lower panel 100 will be described.

A gate conductor including a gate line 121 is disposed on a first substrate 110 including transparent glass, plastic or the like.

The gate line 121 includes a gate electrode 124 extended from a main portion thereof, and a wide end portion (not illustrated) for connection with another layer or an external driving circuit (not illustrated). The gate line 121 may include an aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). However, the gate line 121 may have a multi-layered structure including at least two conductive layers having different physical properties.

A gate insulating layer 140 including silicon nitride (SiNx) or silicon oxide (SiOx) is disposed on the gate conductor 121 and 124. The gate insulating layer 140 may have a multilayered structure including at least two insulating layers having different physical properties.

A semiconductor 154 including amorphous silicon, polysilicon or the like is disposed on the gate insulating layer 140. The semiconductor 154 may include an oxide semiconductor.

Ohmic contacts 163 and 165 are disposed on the semiconductor 154. The ohmic contacts 163 and 165 may include a material such as n+ hydrogenated amorphous silicon in which n-type impurity such as phosphorus is doped at a relatively high concentration or silicide. The ohmic contacts 163 and 165 may be disposed on the semiconductor 154 to make a pair. Where the semiconductor 154 is an oxide semiconductor, the ohmic contacts 163 and 165 may be omitted.

A data conductor including a data line 171, a source electrode 173 extended from a main portion of the data line, and a drain electrode 175 is positioned on the ohmic contacts 163 and 165 and the gate insulating layer 140.

The data line 171 includes a wide end portion (not illustrated) for connection with another layer or an external driving circuit. The data line 171 transfers a data signal and mainly extends in a vertical direction in the plan view to cross the gate line 121.

The data line 171 may have a first curved portion having a curved shape in order to acquire maximum transmittance of the liquid crystal display. A second curved portion which is curved to form a predetermined angle with the first curved portion may be further included, and the first and second curved portions may form a V-lettered shape which meets in a middle region of the pixel area.

The source electrode 173 is an integral part of the data line 171, and extends in substantially a same line as the data line 171. The source electrode 173 and the data line 171 may be a single, unitary, indivisible member. The drain electrode 175 extends parallel with the source electrode 173. Accordingly, the drain electrode 175 is parallel with a remaining part of the data line 171.

The gate electrode 124, the source electrode 173 and the drain electrode 175 form one thin film transistor ("TFT") together with the semiconductor 154, and a channel of the TFT is defined by the semiconductor 154 and may be exposed between the source electrode 173 and the drain electrode 175.

In the illustrated exemplary embodiment, the liquid crystal display includes the source electrode 173 positioned on substantially the same line as that of the data line 171, and the drain electrode 175 extending in parallel with the data line 171. As a result, a width of the TFT may be increased while an area occupied by the data conductor is not increased to thereby increase an aperture ratio of the liquid crystal display.

The data line 171 and the drain electrode 175 may include a refractory metal such as molybdenum, chromium, tantalum and titanium or an alloy thereof, and may have a multilayered structure including a refractory metal layer (not illustrated) and a low resistive conductive layer (not illustrated). An exemplary of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer.

A first passivation layer 180a is disposed on the data conductor 171, 173 and 175, the gate insulating layer 140 and an exposed portion of the semiconductor 154. The first passivation layer 180a may include an organic insulating material, an inorganic insulating material or the like.

A second passivation layer 180b is disposed on the first passivation layer 180a. The second passivation layer 180b may include an organic insulator.

The second passivation layer 180b may be a color filter. Where the second passivation layer 180b is a color filter, the second passivation layer 180b may uniquely display one of primary colors, such as red, green and blue, or yellow, cyan and magenta, and the like. Although not illustrated, the color filters may further display a mixed color of the primary colors or white, in addition to the primary colors.

A common electrode 270 is disposed on the second passivation layer 180b. The common electrode 270 is a first field generating electrode. The common electrode 270 has a planar shape and may be disposed on an entire surface of the first substrate 110 in a plate shape. An opening 138 is defined in the common electrode 270 and is disposed in a region corresponding to a periphery of the drain electrode 175. That is, the common electrode 270 may otherwise have a plate-like planar shape except for a portion in which the opening 138 is defined.

Alternatively, the liquid crystal display may include a plurality of common electrode portions 270 positioned at adjacent pixels and connected to each other to receive a common voltage having a predetermined magnitude supplied from the outside a display area of the liquid crystal display, and the pixel electrode 191 may have the plate-like planar shape.

A third passivation layer 180c is disposed on the common electrode 270. The third passivation layer 180c may include an organic insulating material, an inorganic insulating material or the like.

A pixel electrode 191 is disposed on the third passivation layer 180c. The pixel electrode 191 includes a curved edge which is substantially parallel with the first curved portion and the second curved portion of the data line 171. A plurality of cutouts 91 is defined in the pixel electrode 191, and a plurality of branch electrodes 192 of the pixel electrode 191 is defined by the plurality of cutouts 91.

A first contact hole 185 exposing the drain electrode 175 is defined in thickness of the first passivation layer 180a, the second passivation layer 180b and the third passivation layer 180c. The pixel electrode 191 is physically and electrically connected to the drain electrode 175 through the first contact hole 185 to receive a voltage from the drain electrode 175.

A portion where the first contact hole 185 is disposed forms the contact portion CH. A first alignment layer 11 is disposed on the pixel electrode 191 and the third passivation layer 180c. The first alignment layer 11 includes a photoreactive material. The first alignment layer 11 includes a photolytic material including cyclobutane, or a photoisomerizable material including azobenzene.

Next, the upper panel 200 will be described.

A light blocking member 220 is disposed on a second substrate 210 including of transparent glass, plastic or the like. The light blocking member 220 is otherwise referred to as a black matrix and blocks light.

A plurality of color filters 230 is disposed on the second substrate 210. Where the second passivation layer 180b of the lower panel 100 is a color filter, the color filter 230 of the upper panel 200 may be omitted. Further, in an alternative exemplary embodiment, the light blocking member 220 of the upper panel 200 may also be disposed on the lower panel 100.

An overcoat 250 is disposed on the color filter 230 and the light blocking member 220. The overcoat 250 may include an insulator, such as an organic insulator, reduces or effectively prevents exposure of the color filter 230, and provides a substantially flat surface in the upper panel 200. In an exemplary embodiment, the overcoat 250 may be omitted.

A second alignment layer 21 is disposed on the overcoat 250. The second alignment layer 21 includes a photoreactive material. The second alignment layer 21 includes a photolytic material including cyclobutane, or a photoisomerizable material including azobenzene.

The liquid crystal layer 3 includes a liquid crystal material having positive dielectric anisotropy.

Liquid crystal molecules of the liquid crystal layer 3 are aligned so that long axes thereof are substantially parallel to the panels 100 and 200.

A spacer 325 is disposed between the lower panel 100 and the upper panel 200 to uniformly maintain a distance between the lower panel 100 and the upper panel 200. The spacer 325 is disposed in the contact portion CH where the pixel electrode 191 and the drain electrode 175 are connected to each other. The spacer 325 is disposed between the first alignment layer 11 of the lower panel 100 and the second alignment layer 21 of the upper panel 200. An entire of the spacer 325 may be disposed between the first alignment layer 11 of the lower panel 100 and the second alignment layer 21 of the upper panel 200 such that the spacer 325 is completely between the first alignment layer 11 of the lower panel 100 and the second alignment layer 21 of the upper panel 200.

In an exemplary embodiment of manufacturing a liquid crystal display, the spacer 325 is disposed in the contact portion CH after forming the first alignment layer 11 of the lower panel 100 and the second alignment layer 21 of the upper panel 200.

Accordingly, with respect to an outer surface of the spacer 325, the first alignment layer 11 and the second alignment layer 21 do not contact each other. Therefore, a defect such as releasing of the first alignment layer 11 and the second alignment layer 21 of the liquid crystal display may be reduced or effectively prevented.

The pixel electrode 191 receives a data voltage from the drain electrode 175, and the common electrode 270 receives a common voltage having a predetermined magnitude from a common voltage applying unit (not illustrated) disposed outside of the display area.

The pixel electrode 191 and the common electrode 270 which are field generating electrodes generate an electric field and thus the liquid crystal molecules of the liquid crystal layer 3 positioned between the two field generating electrodes 191 and 270 rotate to be substantially parallel direction to the direction of the electric field. Polarization of light passing through the liquid crystal layer varies according to the determined rotation directions of the liquid crystal molecules.

As such, the two field generating electrodes 191 and 270 are disposed in one single display panel 100, thereby increasing transmittance of the liquid crystal display and implementing a wide viewing angle thereof.

According to the illustrated exemplary embodiment of the liquid crystal display according to the invention, the common electrode 270 has the planar shape, and the pixel electrode 191 has the plurality of branch electrodes, but the invention is not limited thereto. In another exemplary embodiment of the invention, the pixel electrode 191 may have the planar shape, and the common electrode 270 may have the plurality of branch electrodes. By having a planar shape, the electrode may be a single, unitary, indivisible member, in which cutouts are not defined.

Features of one or more exemplary embodiment of the invention may be applied to other devices in which two field generating electrodes in a single panel and on the first substrate 110 overlap each other with an insulating layer therebetween, and in detail, a first field generating electrode disposed below the insulating layer has a planar shape, and a second field generating electrode disposed above the insulating layer has a plurality of branch electrodes.

Figure 4:
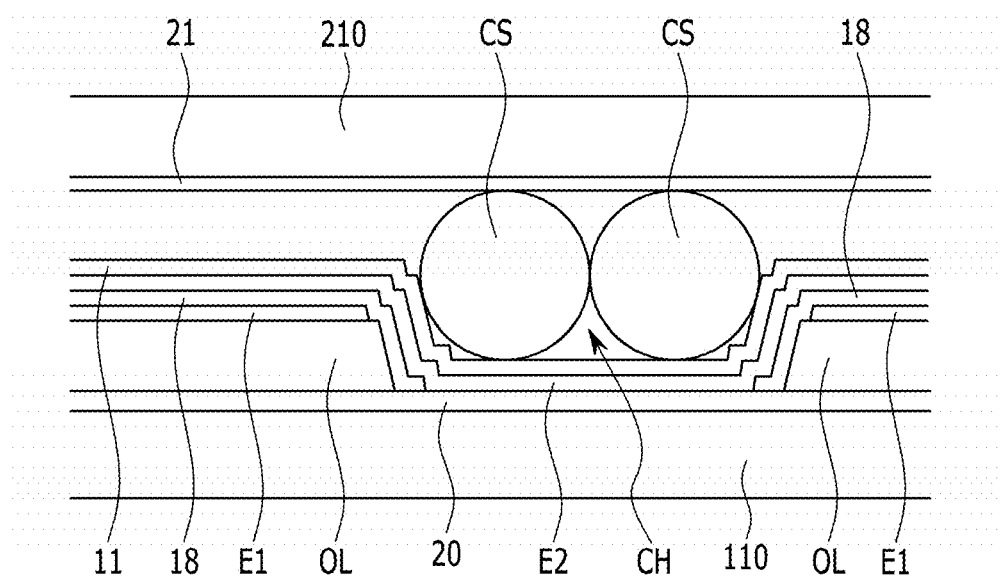
FIG. 4 is a cross-sectional view illustrating an exemplary embodiment of a spacer portion of a liquid crystal display according to the invention.

Next, a spacer portion of a liquid crystal display according to the invention will be described with reference to FIGS. 1 and 4. FIG. 4 is a schematic cross-sectional view illustrating an exemplary embodiment of a spacer portion of a liquid crystal display according to the invention.

Referring to FIGS. 1 and 4, the liquid crystal display includes a first substrate 110 and a second substrate 210 facing each other, and a spacer CS interposed between the two substrates 110 and 210.

A thin film layer 20 such as including a gate line, a data line, a TFT and the like is disposed on the first substrate 110, and an organic layer OL including an organic material is disposed on the thin film layer 20. A first field generating electrode E1 is disposed on the organic layer OL, and an insulating layer 18 is disposed on the first field generating electrode E1. A second field generating electrode E2 is disposed on the insulating layer 18, and a first alignment layer 11 is disposed on the second field generating electrode E2.

The first alignment layer 11 includes a photoreactive material. The first alignment layer 11 includes a photolytic material including cyclobutane, or a photoisomerizable material including azobenzene.

Although not illustrated, the first field generating electrode E1 having a planar shape is disposed on the entire surface of the first substrate 110 as a plate such as in a planar shape, and the second field generating electrode E2 may include a plurality of branch electrodes. The plurality of branch electrodes of the second field generating electrode E2 overlaps with the first field generating electrode E1 disposed in the pixel area.

The organic layer OL is absent from the contact portion CH and thus a height of a surface of the contact portion CH is smaller than a height of remaining portions. The heights may be defined from a common point or surface, such as an upper surface of the substrate 110. The height of a layer or feature may be defined at a maximum distance from that common point or surface.

A second alignment layer 21 is disposed on the second substrate 210.

The spacer CS is disposed between the first alignment layer 11 and the second alignment layer 21, and the spacer CS is disposed at a position overlapping with the contact portion CH.

The spacer CS is disposed in the contact portion CH of the liquid crystal display having the smaller height than other portions of the liquid crystal display.

Figure 5:
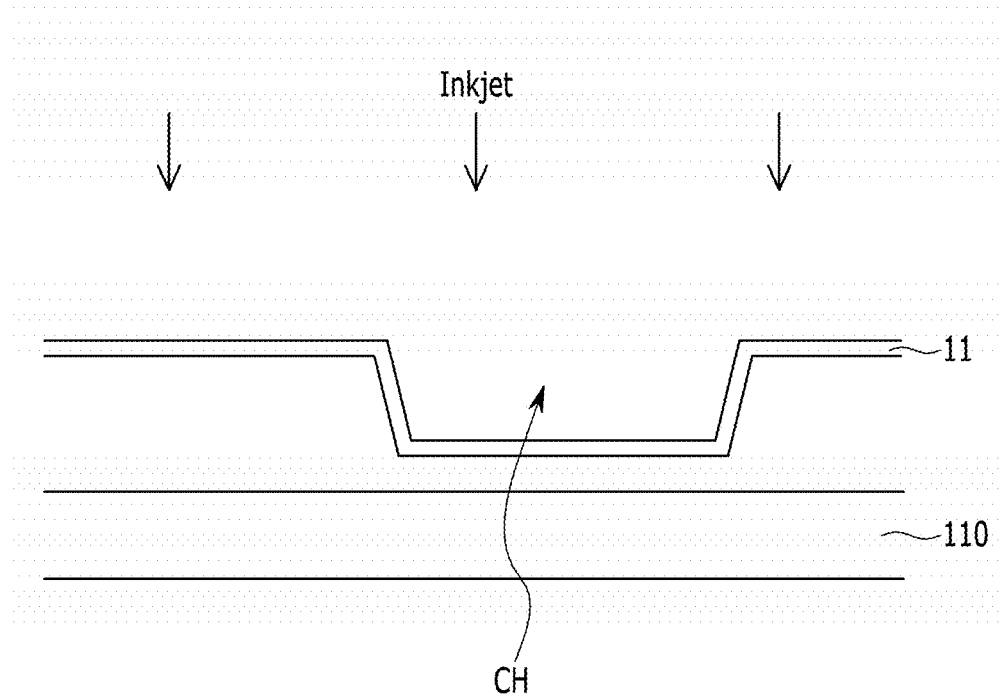
FIGS. 5 to 7 are cross-sectional views illustrating an exemplary embodiment of a manufacturing method of a display device according to the invention.
Figure 6:
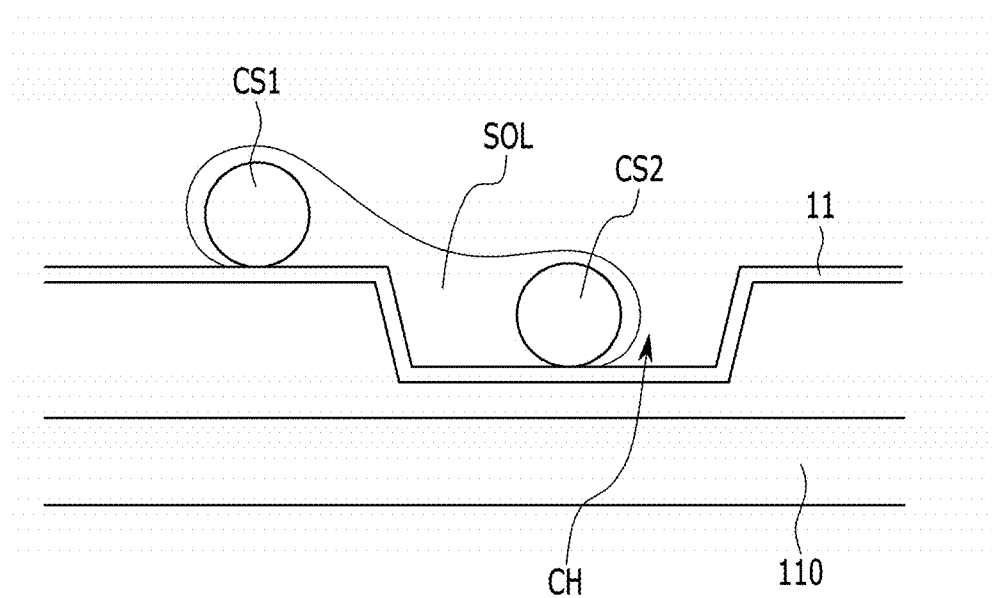
Figure 7:
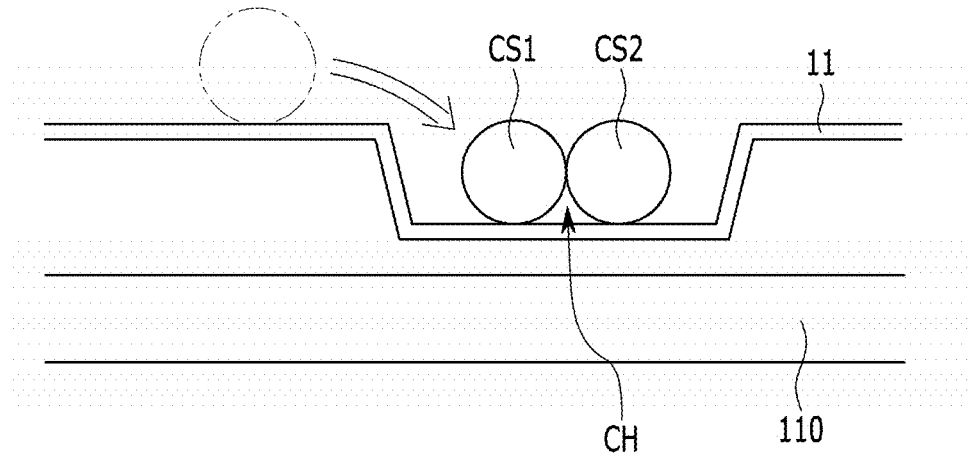
Figure 8:
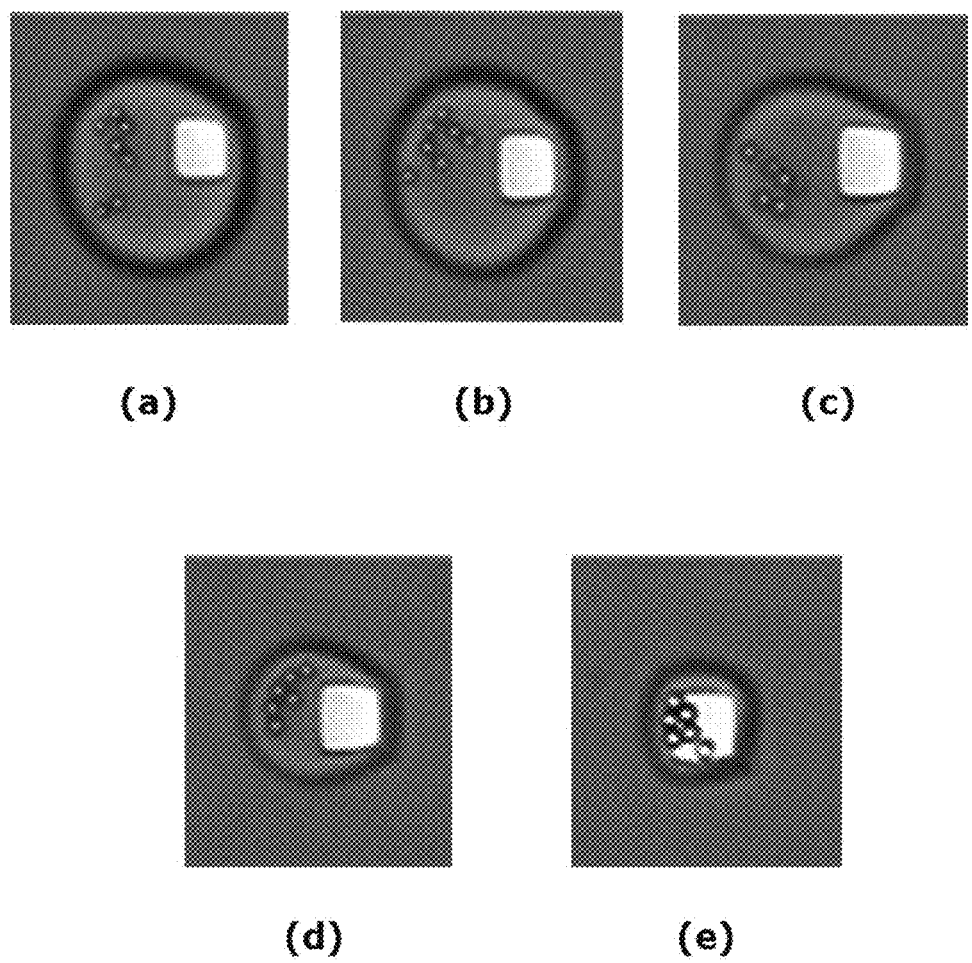
FIG. 8 shows electron micrographs illustrating a result of an Experimental Example of the invention.

Next, an exemplary embodiment of a manufacturing method of a liquid crystal display according to the invention will be described with reference to FIGS. 5 to 7, and 8. FIGS. 5 to 7 are cross-sectional views illustrating an exemplary embodiment of a manufacturing method of a liquid crystal display according to the invention. FIG. 8 shows electron micrographs illustrating a result of an Experimental Example of the invention.

First, as illustrated in FIG. 5, a first alignment layer 11 is disposed on the first substrate 110 where the contact portion CH is formed. Individual layers between the first substrate 110 and the first alignment layer 11 are omitted for convenience of explanation. The first alignment layer 11 is photo-aligned. The first alignment layer 11 includes a photolytic material including cyclobutane, or a photoisomerizable material including azobenzene.

A spacer material is laminated on the first alignment layer 11 by an inkjet method.

Referring to FIG. 6, by using a spacer supply device (not illustrated), a spacer material including a solvent layer SOL in which a plurality of spacer elements (e.g., beads) CS1 and CS2 are dispersed is deposited by a method such as the inkjet method. The solvent layer SOL may have viscosity of about 5±3 centipoise (cP), surface tension of about 33±10 newtons per meter (N/m), and a particle concentration of about 3% to about 5%. Further, a volume of the spacer material may be about 40±10 picoliters per one droplet (pL/1 droplet), and the number of spacer beads CS1 and CS2 included therein may be about 1 to about 10.

A first spacer bead CS1 among the plurality of spacer beads CS1 and CS2 does not drop into the contact portion CH, and a second spacer bead CS2 among the plurality of spacer beads CS1 and CS2 drops in the contact portion CH, as illustrated in FIG. 6.

Next, as illustrated in FIG. 7, the solvent layer SOL is evaporated. Since a depth of the contact portion CH is relatively large, for example, as compared to a single one spacer bead CS, the solvent layer SOL in the contact portion CH is evaporated at a later time than the solvent layer SOL at another portion. Since attraction acts between the solvent layer SOL and the spacer beads CS1 and CS2, the first spacer bead CS1 which is not positioned in the contact portion CH moves toward the second spacer beads CS2 to thereby be positioned in the contact portion CH.

The second alignment layer 21 on the second substrate is prepared.

After the spacer bead CS is disposed in the contact portion CH defined on the first substrate 119, and the second alignment layer 21 is formed on the second substrate 210, the second substrate 210 with the second alignment layer is bonded with the first substrate 110 with the first alignment layer to face each other, and thereby the liquid crystal display is completed.

Next, results of an Experimental Example of the invention will be described with reference to FIG. 8.

In the Experimental Example, a contact portion having a smaller surface height than another (e.g. adjacent) portion is defined on a substrate and then a spacer is formed such as by an inkjet method on the substrate having the contact portion. A spacer material was dropped onto the substrate and then positions of a plurality of spacer beads in the spacer material are measured according to a time during which a solvent layer of the spacer material is evaporated. The measured positions of the spacer beads are illustrated in FIG. 8. The views of (a) to (e) shows sequential views according to time.

Referring to FIG. 8, the light-colored box-shaped feature indicates the contact portion while the multiple circular-shaped features indicate spacer beads. As seen in (a)-(d), a plurality of spacer beads initially disposed outside the contact portion gradually move toward the contact portion as the solvent layer is gradually evaporated. Finally as seem in (e), the plurality of spacer beads fully moves into the contact portion at the latest time represented by (a) through (e).

Figure 9:
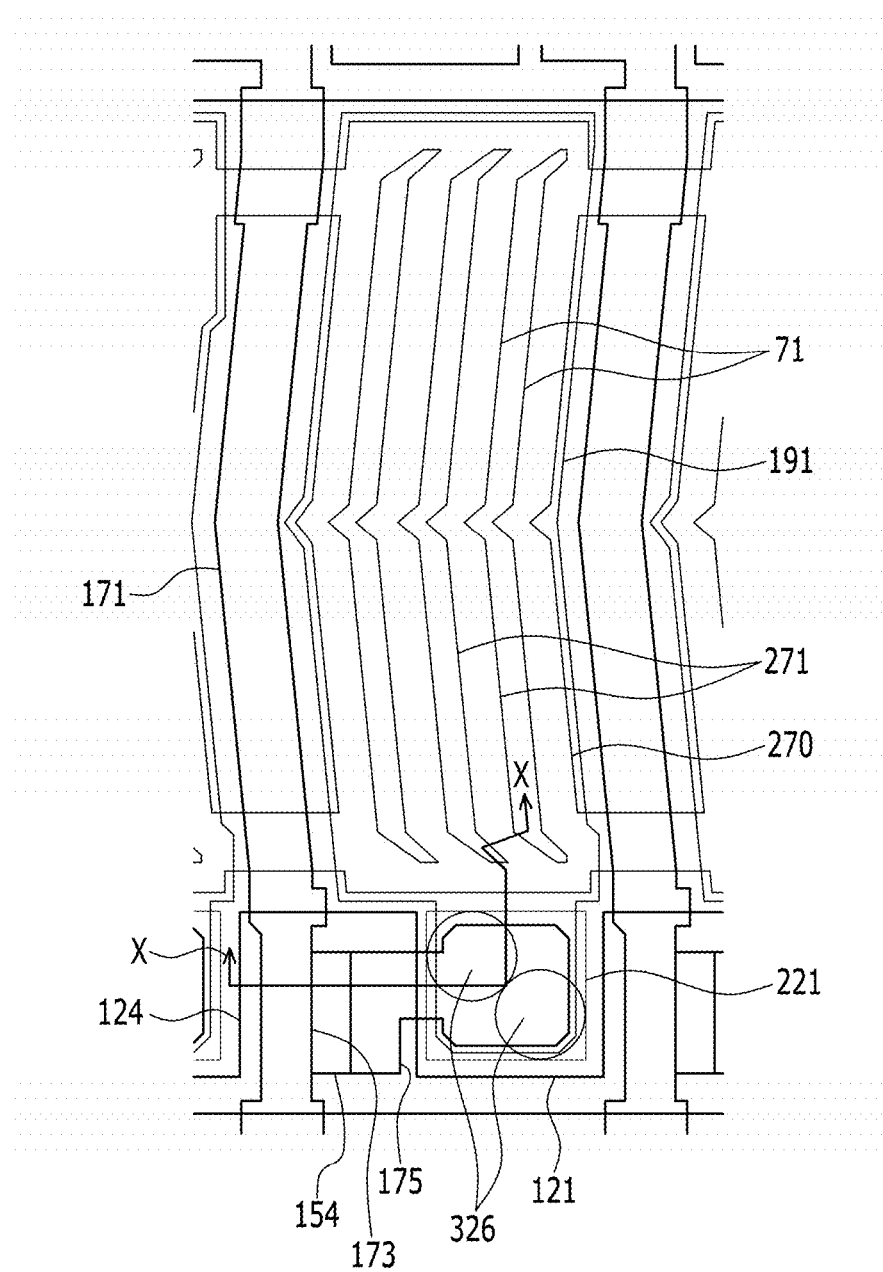
FIG. 9 is a plan view illustrating another exemplary embodiment of one pixel of a liquid crystal display according to the invention.

Next, another exemplary embodiment of a liquid crystal display according to the invention will be described with reference to FIGS. 9 and 10. FIG. 9 is a plan view illustrating another exemplary embodiment of a liquid crystal display according to the invention, and FIG. 10 is a cross-sectional view of the liquid crystal display of FIG. 9 taken along line X-X.

Figure 10:
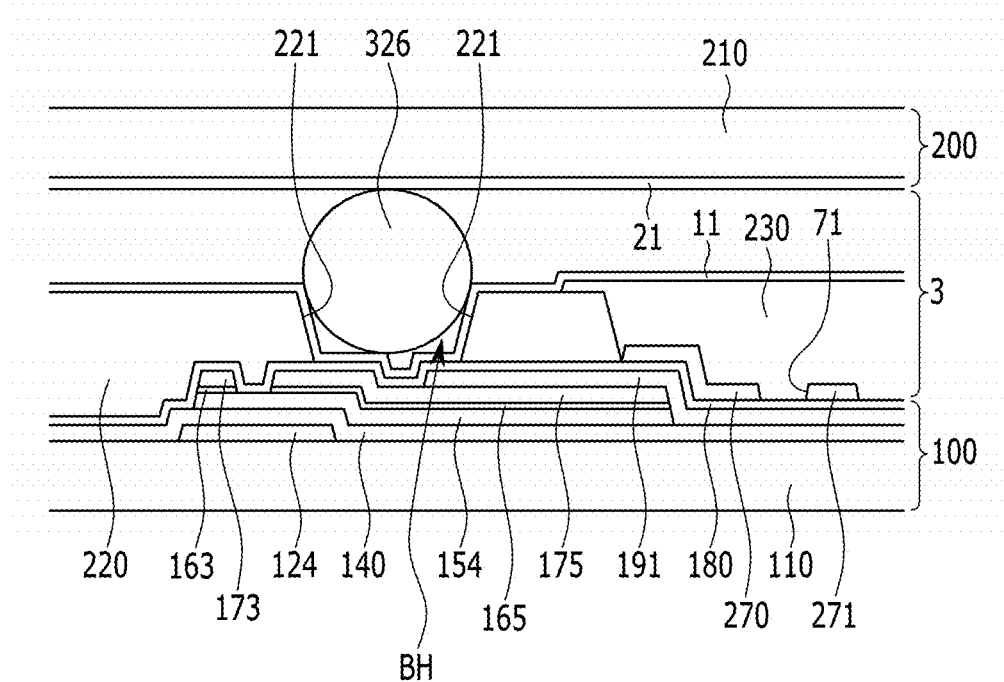
FIG. 10 is a cross-sectional view of the liquid crystal display of FIG. 9 taken along line X-X.

Referring to FIGS. 9 and 10, the liquid crystal display is similar to the liquid crystal display illustrated in FIGS. 2 and 3. The detailed description for like constituent elements is omitted.

The liquid crystal display includes a lower panel 100 and an upper panel 200 facing each other, and a liquid crystal layer 3 disposed therebetween.

First, the lower panel 100 will be described.

A gate conductor including a gate line 121 is disposed on the first substrate 110.

A gate insulating layer 140 including silicon nitride (SiNx), silicon oxide (SiOx), or the like is disposed on a gate conductor 121.

A semiconductor layer 154 is disposed on the gate insulating layer 140.

Ohmic contacts 163 and 165 are disposed on the semiconductor 154. Where the semiconductor 154 is an oxide semiconductor, the ohmic contacts 163 and 165 may be omitted.

A data conductor including a data line 171, a source electrode 173 extending from a main portion of the data line 171, and a drain electrode 175 is positioned on the ohmic contacts 163 and 165 and the gate insulating layer 140.

A pixel electrode 191 is disposed directly on the drain electrode 175. The pixel electrode 191 has a planar shape, that is, a plate shape, and is disposed in one pixel area. The plate shape pixel electrode 191 disposed in one pixel area may not be connected to a pixel electrode in an adjacent pixel area.

A first passivation layer 180 is disposed on the data conductor 171, 173 and 175, the gate insulating layer 140, and an exposed portion of the semiconductor 154, and the pixel electrode 191.

A common electrode 270 is disposed on the passivation layer 180. The liquid crystal display may include a plurality of common electrode portions 270 each disposed in a pixel area and connected to each other to receive a reference voltage from a reference voltage applying unit (not illustrated) disposed outside of the display area.

The common electrode portion 270 in a pixel area includes a curved edge substantially parallel to a first curved portion and a second curved portion of the data line 171, and the common electrode portions 270 disposed in the adjacent pixels are connected to each other. A connecting portion of the common electrode 270 may connect adjacent common electrode portions to each other.

A plurality of second cutouts 272 may be defined in a common electrode portion of the common electrode 270. The common electrode portion includes a plurality of second branch electrodes 271 defined by the plurality of second cutouts 272.

A light blocking member 220 and a color filter 230 are disposed on the common electrode 270 and the passivation layer 180. An opening 221 is defined in the light blocking member 220. A step between the opening 221 and a portion of the light blocking member 220 at a peripheral region thereof is generated due to height differences of between the opening 221 and the portion of the light blocking member 220 adjacent to the opening 221. The step may be otherwise referred to as a step portion BH indicated in FIG. 10.

A first alignment layer 11 is disposed on the light blocking member 220. The first alignment layer 11 includes a photoreactive material. The first alignment layer 11 includes a photolytic material including cyclobutane, or a photoisomerizable material including azobenzene.

Next, the upper panel 200 will be described.

A second alignment layer 21 is disposed on a second substrate 210. The second alignment layer 21 includes a photoreactive material. The second alignment layer 21 includes a photolytic material including cyclobutane, or a photoisomerizable material including azobenzene.

In an exemplary embodiment of a liquid crystal display, one or more spacer 326 is disposed between the first alignment layer 11 and the second alignment layer 21. An entire of the spacer 325 may be disposed between the first alignment layer 11 of the lower panel 100 and the second alignment layer 21 of the upper panel 200 such that the spacer 325 is completely between the first alignment layer 11 of the lower panel 100 and the second alignment layer 21 of the upper panel 200.

The spacer 326 is disposed in the step portion BH formed by the opening 221 and portions of the light blocking member 220 defining the opening 221.

According to the exemplary embodiment of the liquid crystal display according to the invention, the two field generating electrodes are formed on one substrate in a single display panel to increase transmittance and implement a wide viewing angle. After the photo-alignment layers are disposed on the one substrate of the single display panel and on a substrate of another display panel, the two substrates are disposed to face each other, such that a spacer disposed in the contact portion or the step portion which has a smaller surface height than an adjacent portion of the liquid crystal display, and as a result, the photo-alignment layers do not contact each other, thereby reducing or effectively preventing a defect such as releasing of the alignment layers of the liquid crystal display.

According to exemplary embodiment of the liquid crystal display illustrated in FIGS. 9 and 10, the pixel electrode 191 has the planar shape, and the common electrode 270 has the plurality of branch electrodes, but according to an alternative exemplary embodiment of the invention, the common electrode 270 may have the planar shape, and the pixel electrode 191 may have the plurality of branch electrodes.

Features of one or more exemplary embodiment of the invention may be applied to other display devices where two field generating electrodes in a single panel on a substrate overlap each other with an insulating layer therebetween, and in detail, a first field generating electrode disposed below the insulating layer has a planar shape, and a second field generating electrode disposed above the insulating layer has a plurality of branch electrodes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the invention.

What is claimed is:

1. A liquid crystal display, comprising:
a first substrate;
a first electrode and a second electrode on the first substrate and overlapping each other;
a first insulating layer between the first and second electrodes;
a second insulating layer on the first substrate;
a first opening defined in the first insulating layer and a second opening defined in the second insulating layer;
a first alignment layer on the first electrode and the second electrode and on the first substrate;
a second substrate facing the first substrate;
a second alignment layer between the first alignment layer and the second substrate; and
a spacer between the first alignment layer and the second alignment layer,
wherein the spacer overlaps the first opening and the second opening and is in the second opening defined in the second insulating layer.

2. The liquid crystal display of claim 1, wherein:
the first alignment layer and the second alignment layer are photo-alignment layers.

3. The liquid crystal display of claim 2, wherein:
the spacer has a bead form.

4. The liquid crystal display of claim 3, wherein:
the second insulating layer comprises an organic material.

5. The liquid crystal display of claim 4, wherein:
the first electrode has a planar shape and is on an entire surface of a pixel area defined on the first substrate,
the second electrode comprises a plurality of branch electrodes, and
the plurality of branch electrodes overlaps with the first electrode having the planar shape.

6. The liquid crystal display of claim 5, further comprising:
a gate line, a data line, and a thin film transistor connected to the gate line and the data line, on the first substrate,
wherein the thin film transistor is connected to the first electrode or the second electrode at the first opening and the second opening.

7. The liquid crystal display of claim 5, wherein:
the second insulating layer is a light blocking member.

8. The liquid crystal display of claim 1, wherein:
the second insulating layer comprises an organic material.

9. The liquid crystal display of claim 8, wherein:
the spacer has a bead form.

10. The liquid crystal display of claim 9, wherein:
the first electrode has a planar shape and is on an entire surface of a pixel area defined on the first substrate,
the second electrode comprises a plurality of branch electrodes, and
the plurality of branch electrodes overlaps with the first electrode having the planar shape.

11. The liquid crystal display of claim 10, further comprising:
a gate line, a data line, and a thin film transistor connected to the gate line and the data line, on the first substrate,
wherein the thin film transistor is connected to the first electrode or the second electrode at the first opening and the second opening.

12. The liquid crystal display of claim 10, wherein:
the second insulating layer is a light blocking member.

13. The liquid crystal display of claim 1, wherein:
the spacer has a bead form.

14. The liquid crystal display of claim 13, wherein:
the first electrode has a planar shape and is on an entire surface of a pixel area defined on the first substrate,
the second electrode comprises a plurality of branch electrodes, and
the plurality of branch electrodes overlaps with the first electrode having the planar shape.

15. The liquid crystal display of claim 14, further comprising:
a gate line, a data line, and a thin film transistor connected to the gate line and the data line, on the first substrate,
wherein the thin film transistor is connected to the first electrode or the second electrode at the first opening and the second opening.

16. The liquid crystal display of claim 14, wherein:
the second insulating layer is a light blocking member.

17. The liquid crystal display of claim 1, wherein:
the first electrode has a planar shape and is on an entire surface of the pixel area,
the second electrode comprises a plurality of branch electrodes, and
the plurality of branch electrodes overlaps with the first electrode having the planar shape.

18. The liquid crystal display of claim 17, further comprising:
a gate line, a data line, and a thin film transistor connected to the gate line and the data line, on the first substrate, wherein the thin film transistor is connected to the first electrode or the second electrode at the first opening and the second opening.

19. A liquid crystal display comprising:

a first substrate;

a first electrode and a second electrode on the first substrate and overlapping each other;

a first insulating layer between the first and second electrodes;

a light blocking member on the first substrate, and an opening defined in the light blocking member;

a first alignment layer on the first electrode and the second electrode and on the first substrate, a second substrate facing the first substrate;

a second alignment layer between the first alignment layer and the second substrate; and a spacer between the first alignment layer and the second alignment layer, wherein the spacer is in the opening defined in the light blocking member.

20. The liquid crystal display of claim 19, wherein:

an entire of the spacer is between the first and second alignment layers.

\* \* \* \* \*